United States Patent [19]

Bacehowski et al.

[11] Patent Number: 4,846,005

[45] Date of Patent: Jul. 11, 1989

[54] SET WITH ATTACHABLE SAMPLE CELL

[75] Inventors: David V. Bacehowski, Wildwood; Arnold C. Bilstad, Deerfield, both of Ill.; Patrick N. Huehls, Indianapolis, Ind.; Stephen B. Kaufman, Highland Park; Jeffrey E. Miripol, Evanston, both of Ill.

[73] Assignee: Baxter International Inc., Deerfield, Ill.

[21] Appl. No.: 82,076

[22] Filed: Aug. 5, 1987

Related U.S. Application Data

[63] Continuation-in-part of Ser. No. 940,816, Dec. 12, 1986.

[51] Int. Cl.[4] .................... G01N 1/00

[52] U.S. Cl. .................... 73/864.81; 73/863.81; 73/863.71; 128/771

[58] Field of Search .......... 73/863.81, 863.82, 863.83, 73/863.85, 863.86, 864.81, 864.83, 864.21, 863.72, 863.73, 864.34, 803.71; 422/82; 128/771, 767; 604/409, 410, 262

[56] References Cited

U.S. PATENT DOCUMENTS

| | | | |
|---|---|---|---|
| 2,690,179 | 9/1954 | Fox | 128/767 |
| 2,896,619 | 7/1959 | Bellamy, Jr. | 604/409 |
| 2,950,716 | 8/1960 | Bellamy, Jr. et al. | 604/409 |
| 3,186,234 | 6/1965 | Solnick et al. | 73/863.71 |
| 3,187,750 | 6/1965 | Tenczar, Jr. | 604/410 |
| 3,420,224 | 1/1969 | Farr | 73/863.85 |
| 3,843,326 | 10/1974 | Lichtenstenen | 422/82 |
| 3,983,864 | 10/1976 | Sielaff et al. | 73/864.81 |
| 4,259,291 | 3/1981 | Smythe | 73/864.21 |
| 4,624,148 | 11/1986 | Averette | 73/864.21 |

*Primary Examiner*—Stewart J. Levy

*Assistant Examiner*—Robert R. Raevis

*Attorney, Agent, or Firm*—Paul C. Flattery; Bradford R. L. Price; Paul M. Vargo

[57] ABSTRACT

A fluid delivery system has a container with an integrally attached sample cell. A selected fluid can be accumulated in the container. The sample cell can be filled with part of the fluid in the container and then isolated from the container by heat or dielectric sealing. The fluid in the sample cell can be brought into contact with selected test reagents. The test reagents can provide a visual indicia of the presence of selected characteristics in the fluid.

30 Claims, 13 Drawing Sheets

FIG. 25
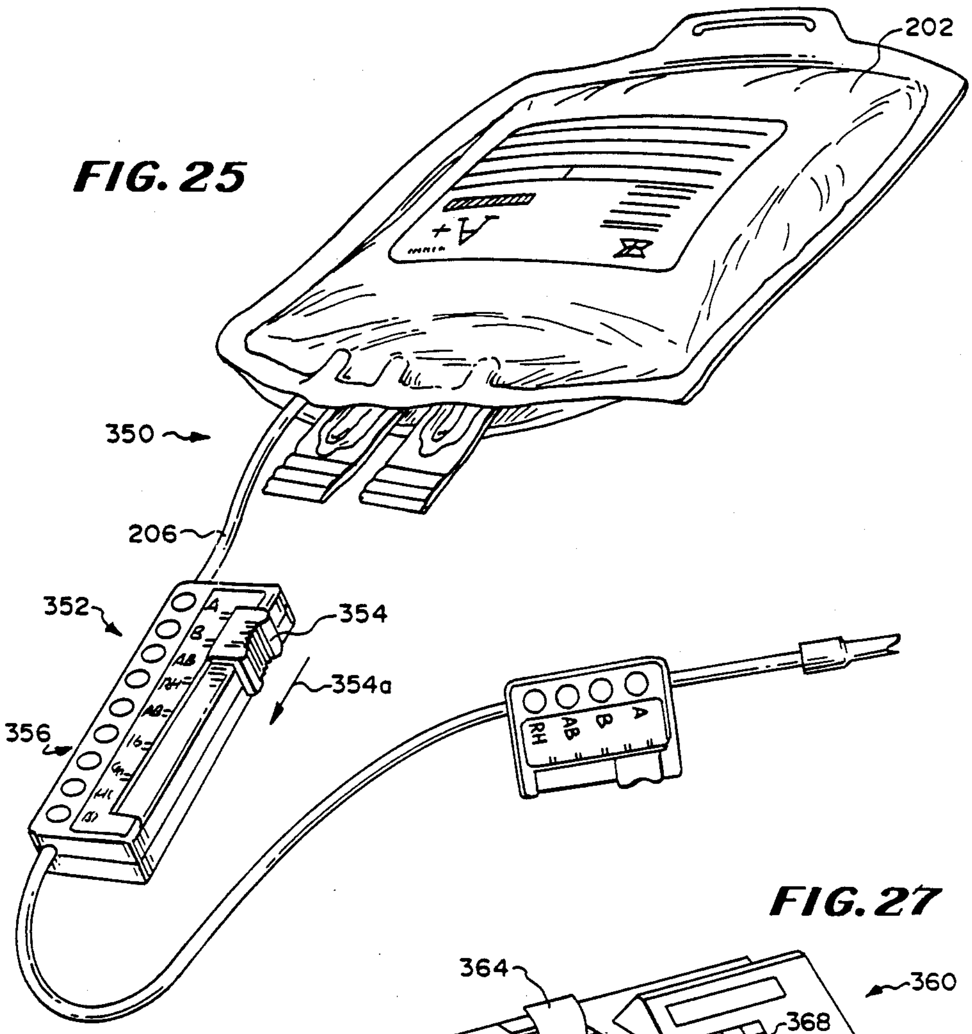
FIG. 27
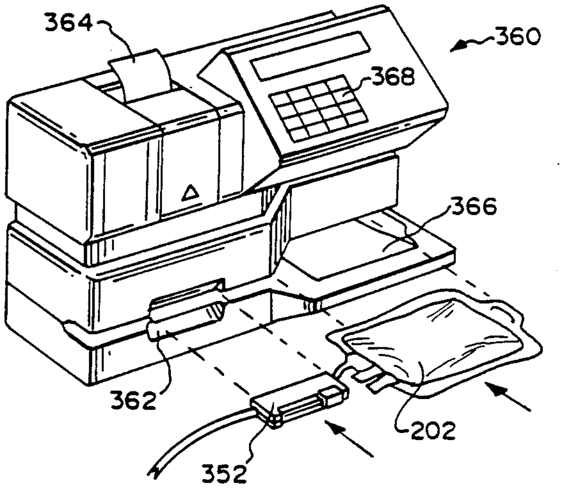
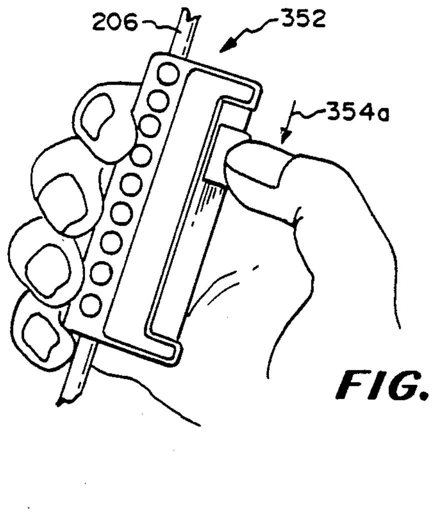
FIG. 26

SET WITH ATTACHABLE SAMPLE CELL

This is a continuation-in-part of patent application Ser. No. 940,816 entitled Set With Integrally Formed Sample Cell filed Dec. 12, 1986.

FIELD OF THE INVENTION

The invention pertains to apparatus and methods for determining the presence or absence of a specified characteristic in a fluid sample. More particularly, the invention pertains to containers usable for the accumulation and transportation of medical fluids, such as blood or blood components. Sample cells are attachable thereto for the purpose of conducting analysis to determine whether or not a predetermined characteristic is present in the blood or blood component.

BACKGROUND OF THE INVENTION

The collection of whole blood from donors has become a highly refined and very successful activity. Blood collection sites are routinely established, on a temporary basis, in church basements and recreation halls or in trailers by organizations such as the American National Red Cross and its related counterparts for the purpose of making the donation of whole blood very convenient.

One aspect of the success of such blood donation campaigns has been the development and widespread use of sterile, plastic blood collection sets. These sets are designed for use with blood accumulated from one donor and are manufacturable very inexpensively. Such sets are well-known and are described for example in U.S. Pat. No. 4,222,379 to Smith issued Sept. 16, 1980.

One aspect of the use of such sets is that they can be formed with multiple interconnected containers for the purpose of separating the whole blood into components within a single sealed sterile system. As a result of the use of such multi-container donation sets, the whole blood can be separated into components such as platelets, plasma and the remaining residual concentrated red blood cells. After processing and separation, the various containers are sealed, separated from one another and are stored and then made available to medical centers or hospitals as needed.

The collection center will probably test the whole blood and/or components. These tests can include but are not limited to ABO typing, Rh determination, D$\mu$determination, antibody screen, syphilis screen, $HB_sA_g$ screen and the HTLV3 or HIV antibody test. The results of these tests are often manually recorded on the respective container or containers.

To conduct these tests it is necessary to remove a sample from the collection or component container. To date, it has not been possible to conduct such tests on a production basis without separating the specimen from the contents of the respective container.

Prior to the use of whole blood or components it is common practice for the center expecting to use the blood or components to again conduct various types of tests with respect to those fluids. For example, before whole blood is provided to a patient, it is routinely ABO tested to insure that the patient is receiving the correct type of blood. The various alternate tests may be conducted again as well.

After determining blood type immediately prior to expected administration, if for some reason the patient does not need that particular unit of blood, it will be returned to the blood storage center of the hospital. Prior to being used subsequently, it will be retyped again. Each time, immediately prior to administration, it is standard practice to retype each blood unit.

One known system of collecting and typing blood utilizes a multicontainer blood collection pack marketed by Travenol Laboratories, Inc. under the trademark BLOOD-PACK. In this system a flexible collection container is provided. Attached to the collection container is a fluid flow conduit. A free end of the fluid flow conduit has a draw cannula attached thereto.

In use, the draw cannula is used to pierce the vein of donor and a unit of blood is collected in the container. Subsequent to the collection phase, the draw conduit is sealed near the cannula. Any blood remaining in the draw conduit is forced into the container and mixed with anticoaulant in the container. A portion of the blood in the container is then forced into the draw conduit. The draw conduit can be heat sealed at a plurality of points. An identification number is repetitively printed on the draw conduit.

During the draw phase, the blood collection center will fill a pilot tube with blood drawn from the donor for the purpose of typing the blood in the container. Subsequently, when the Medical Center prepares to utilize the blood in the container, one or more of the sealed segments of the draw conduit can be broken off at a heat seal. The blood in the broken off section of the draw conduit can then be removed from that section of the conduit and ABO tested. Additionally, the blood can be removed from a second segment of the draw conduit and cross matched with a portion of the patient's blood. The identification number which has been repetitively printed on the draw conduit provides a permanent identification of the removed tubing segments which can be related to the collection container.

In the above described system, the segments of the draw conduit are sealed by dielectric or heat sealing subsequent to the container having been filled with the unit of blood. Further, it is standard practice to separate the segments from the BLOOD PACK for the purpose of carrying out the necessary ABO testing, cross matching, and/or other testing.

As an alternate to traditional tests for blood type, dry dip stick tests have been developed. The dip sticks display a visible indicium in the presence of predetermined characteristics, such as type A, B or O, of a blood sample applied thereto. Such tests have also been extended beyond blood typing.

The process of multiple testing units of blood prior to use is not only very common but is expensive. However, there has not been an acceptable alternate in view of the fact that units of blood may be shipped from city to city and/or state to state prior to usage. Hence, there continues to be a need for a system and/or method which would, in a highly reliable fashion, provide for testing for selected characteristics of a liquid such that it would only be necessary to carry out the test once. The results of such an apparatus or method could be substantial savings in test expenses without compromising the reliability of the test.

SUMMARY OF THE INVENTION

A fluid delivery system is provided which can be used in connection with a wide variety of fluids. The system includes a container in which the fluid can be collected or accumulated. Affixable to the container is at least one sample or specimen cell. The sample cell is in fluid flow communication with the internal volume of the container. When the fluid is accumulated in the container, a portion is available to the attachable sample cell. The sample cell and the test specimen can then be isolated from the remainder of the fluid in the container. However, even though the sample cell has been isolated, it remains attached to the container.

Subsequently, the contents of the sample cell can be analyzed. In accordance with the invention, the analysis can be carried out using reagents carried in the sample cell which can be brought into contact with the test specimen. The reagents can be prepositioned in the sample cell during the manufacture thereof. In this embodiment, the test specimen is brought into contact with one or more reagents within the sealed test cell after that cell has been attached to the container.

For example, as is well known, certain reagents exhibit characteristic colors when brought into contact with various predetermined substances. Such reagents are often used on pH test strips.

A visual determination can be made based on the colors exhibited by the various reagents in the reagent cells in response to the presence or absence of one or more predetermined characteristics in the test specimen. This visual determination can be repeated as often as necessary but the actual test process needs to be carried out only one time.

In one embodiment, the container can be formed as a standard blood collection container. Alternately it could be formed as a blood component container. The sample cells could be attached to a tubular member extending from an edge of the container. The tubular member is in fluid flow communication with the interior of the container.

Reagents for typing blood can be pre-loaded into reagent cells which can be separated from the sample cell or cells by means of frangible members.

Subsequent to isolating the sample cell or cells from the liquid in the adjacent collection container, the frangible members can be broken in order that the liquid to be tested can be brought into contact with the various reagents. Reagents can be used which give a visual indication of the presence or absence of selected characteristics such as ABO blood type or Rh factor.

Alternately, the sample cell or cells can be positioned in a sensing apparatus. The apparatus can be used to optically sense one or more test results displayed by the sample cell. Subsequent to testing, a marking apparatus can be directed at a portion of the container for the purpose of permanently marking the container with the results of the analysis. This indicium might include a blood type such as A, B, AB or O as well as whether the blood is Rh positive or negative. Other test results can also be permanently marked on the container.

The test cell can be formed with first and second rectangular, hinged members. A slot is formed in the first member. The slot receives an elongated section of tubing which is in fluid flow communication with the contents of the collection container. The second member can be pivoted into contact with the first member and locked thereto with the section of tubing clamped therebetween.

Fluid isolated in the sample cell can then be brought into contact with reagents preloaded into the cell. A visual display carried by the cell can provide optically discernable test results.

A sensing mechanism can then be used to optically detect those test results. An imprinting apparatus can permanently mark the container therewith. The test cell is carried with the container, permanently attached thereto. Test results can be reviewed later as needed.

The present system and method are particularly advantageous in that there is a very high degree of assurance that the test results are not only realiable but are based on the fluid in the container. Due to the structure of the system, the specimen or specimens on which the analysis has been conducted are drawn only from the fluid in the container in a way that eliminates potential confusion or mix-up as to the source of the specimen. Further, it is not necessary to manually record the test results on the container. This eliminates another potential source of error. The test results displayed by the test cell can be optically inspected subsequently if desired without having to rerun the tests.

Numerous other advantages and features of the present invention will become readily apparent from the following detailed description of the invention and the embodiments thereof, from the claims and from the accompanying drawings in which the details of the invention are fully and completely disclosed as a part of this specification.

DESCRIPTION OF THE DRAWINGS

FIG. 25 is a view in perspective of yet another attachable sample cell in accordance with the present invention;

FIG. 26 is a view illustrating one of the steps of a method of use of the sample cell of FIG. 25; and FIG. 27 is a perspective view of a system usable with the attachable sample cell of FIG. 25 for sensing the results thereof and for inprinting those results on the associated container.

DETAILED DESCRIPTION OF THE PREFERRED EMBODIMENTS

Figure 1:
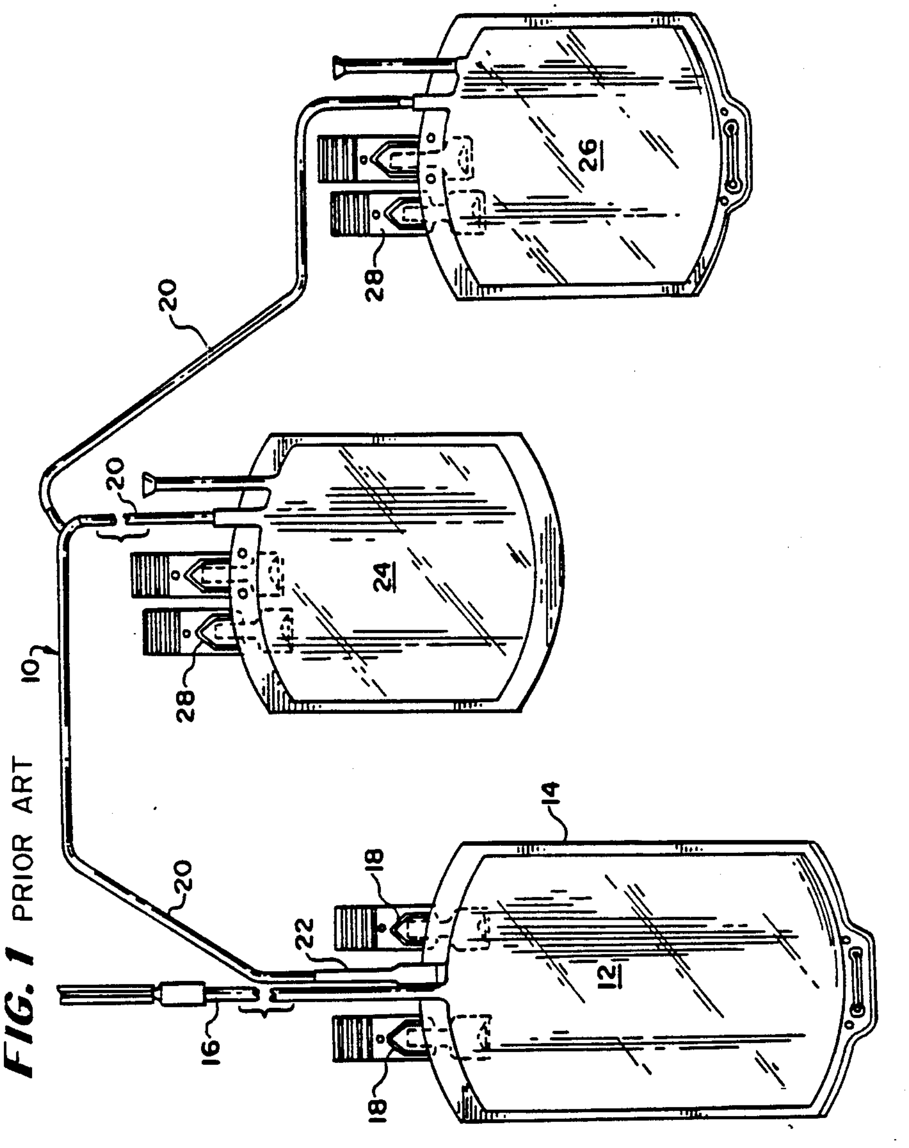
FIG. 1 PRIOR ART
FIG. 1 is an overall plan view of a prior art multi-container blood collection set.

While this invention is susceptible of embodiment in many different forms, there is shown in the drawing and will be described herein in detail specific embodiments thereof with the understanding that the present disclosure is to be considered as an exemplification of the principles of the invention and is not intended to limit the invention to the specific embodiments illustrated.

FIG. 1 is a plan view of a multiple blood bag collection system of a generally known type. The system 10 includes a donor bag 12 of a conventional variety which can be made of plastic sheets sealed at the periphery 14. A blood collection tube 16 is provided for the purpose of filling the container 12. Subsequent to the filling operation, the tube 16 is sealed. Sealing can be accomplished by radio frequency heating of a portion of the tube 16 which melts and fuses the tube. The container 12, as is conventional, is also provided with output ports 18.

A flexible fluid flow conduit 20 coupled to the container 12 at junction member 22 provides a fluid flow path to component containers 24 and 26. Each of the containers 24 and 26 is of a conventional variety and includes output ports 28. Testing of the contents of the containers 12, 24 or 26 conventionally requires removal of a specimen from the respective container.

Figure 2:
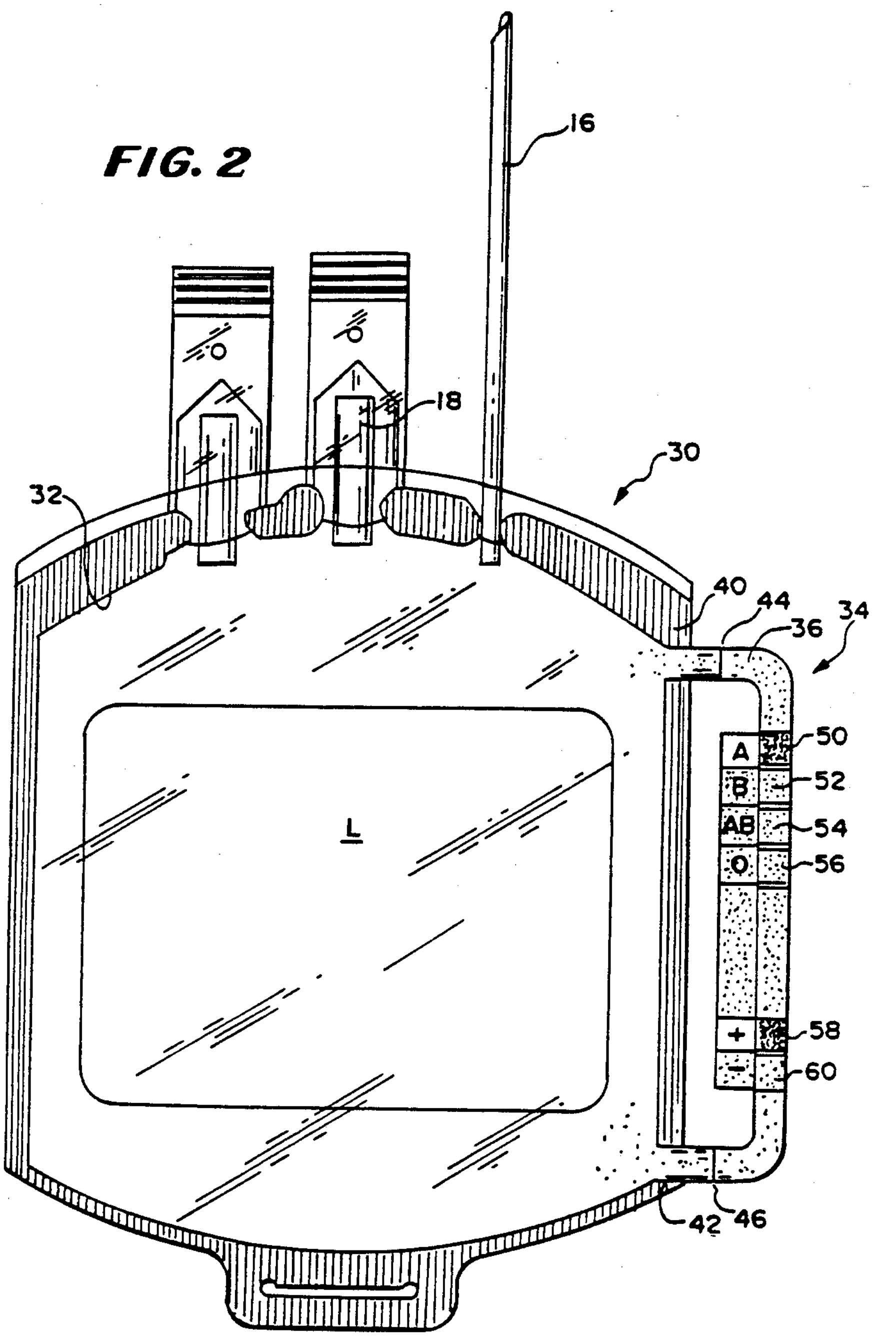
FIG. 2 is a plan view of a modified container with attached specimen and reagent cells.

FIG. 2 illustrates a modified container 30. Testing of the contents of the container 30 can be carried out without separating the specimen therefrom. The container 30 might correspond to any one of the containers 12, 24 or 26 of FIG. 1. Alternately, the container 30 could correspond to other types of containers used for the collection or transportation of various types of fluids.

The container 30 defines an interior volume 32 wherein a fluid such as a liquid L can be accumulated. As is well known, if the liquid L corresponds to blood or blood components, the container 30 can be formed from a variety of medical grade plastics.

Attached to and integrally formed with the container 30 is a generally U-shaped member 34. The member 34 is formed with a tubular conduit 36 which is in fluid flow communication with the internal volume 32 of the container 30. The actual shape of the conduit 36 is not a limitation of the present invention.

The tubular member 36 is attached to the container 30 at regions 40 and 42. By virtue of attachment at the regions 40 and 42, the tubular member 36 cannot be removed from the container 30 without destroying the container. At the same time, the member 36 can be at least partly filled with fluid from the container. It is an important feature of the embodiment of FIG. 2 that the only way the tubular member 36 can be filled is with a portion of the fluid in the container 30. The tubular member 36 thus forms a sample or specimen cell. It is also an important feature of the embodiment of FIG. 2 that the contents of the specimen cell 36 are not physically disassociated from the container 30.

The way in which the fluid, which could be a selected liquid L, is accumulated in the container 30 is also not a limitation of the present invention. Once the liquid L has been accumulated, the input tubing 16 can be dielectrically or heat sealed resulting in a closed system. In addition, subsequent to partially filling the tubing member 36 with part of the liquid from the container 30, the tubing member 36 can be isolated from the container 30 by radio frequency sealing at regions 44 and 46. Once the tubing member 36 has been sealed at regions 44 and 46, testing may take place therein without in any way compromising the integrity of the remainder of the liquid L in the container 30.

The fluid which at least partly fills the specimen cell 36 is a specimen which can be tested. The specimen cell 36 can be preloaded with a plurality of preselected reagents 50-60. In the exemplary embodiment of FIG. 2, if the liquid L is a unit of blood, the reagents 50-60 could correspond to those used to identify blood types A, B, AB, and O as well as Rh positive and Rh negative factors. These reagents are well known and are disclosed in a widely available publication, *Technical Manual of the American Association of Blood Banks*, 9th Edition, 1985. Reagents can be selected that provide a visual indication, such as color, of blood type and Rh factor.

The analysis of the specimen in the specimen cells 36 is carried out entirely within the cell. Testing can be self initiated by absorption of the specimen, the blood, through a matrix of reagent material. Alternately, testing can be initiated by the use of roller pressure applied to the tubing member 36 to crush and activate pods or pellets containing the test reagents.

It will be understood that while a selected plurality of exemplary test reagents is illustrated in FIG. 2, the combination or choice of test reagents is not a limitation of the present invention.

Subsequent to the interaction between the specimen and the plurality of test reagents, one or more visual indicators is generated, for example a predetermined color, to indicate the presence or absence of a specific predetermined characteristic. For example, with respect to the container 30 of FIG. 2, a predetermined color can be exhibited and visually observed for blood type, such as type A as illustrated by the indicated color of the reagent 50 and Rh positive factor as indicated by the color of the reagent member 58.

Thus, the member 34 provides a sealed system attached to the container 30 wherein the desired analysis takes place of a portion of the liquid L. Further, the member 34 remains fixedly attached to the container 30 as it is transported. As a result, the analysis and testing need be carried out only once as the container 30 carries with it a continually visible indicator of the results of that testing.

Figure 3:
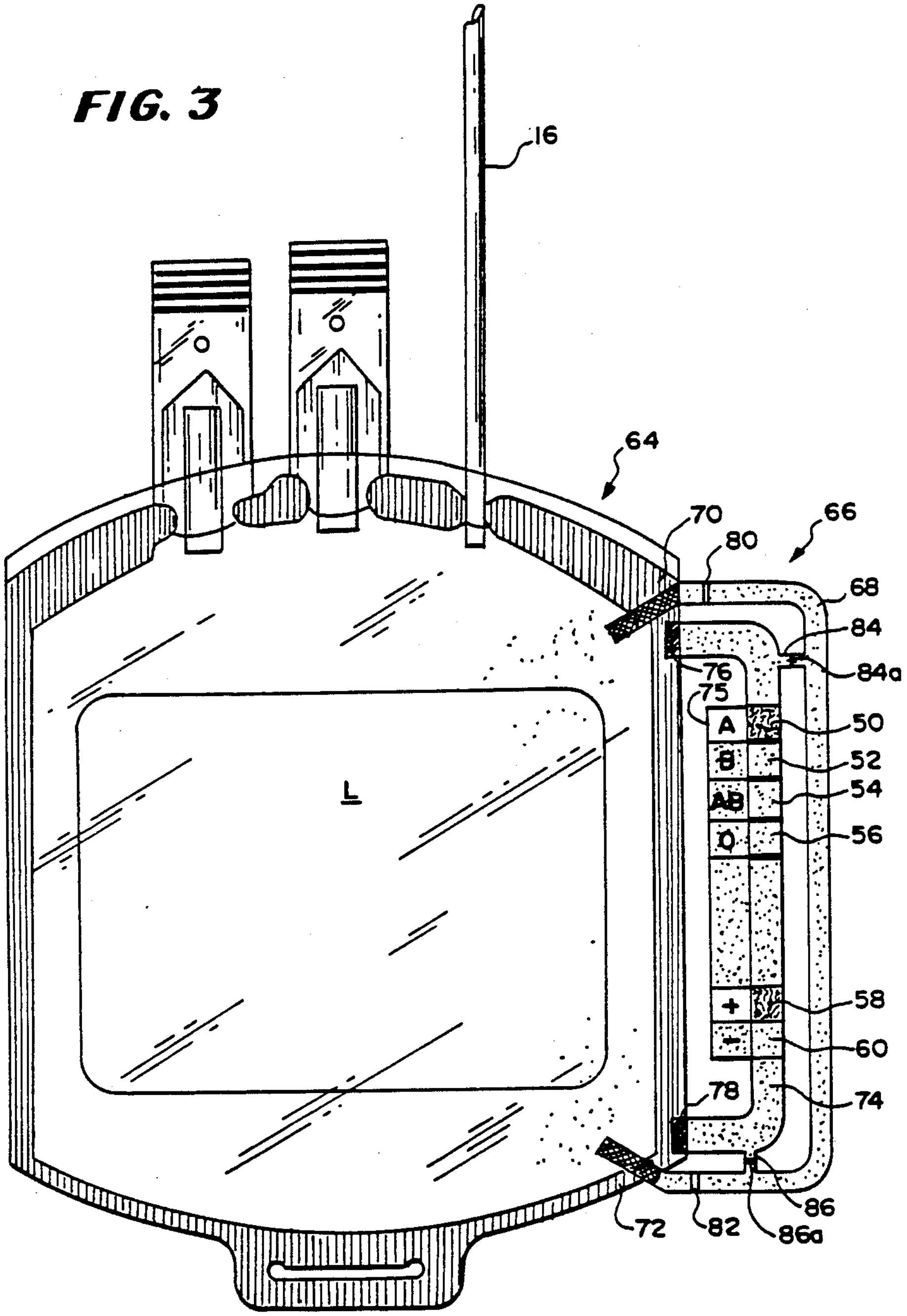
FIG. 3 is a plan view of a modified container illustrating an alternate structure of the specimen and reagent cells.

FIG. 3 illustrates an alternate container 64. The container 64 can also be used to accumulate a liquid L. Attached to the container 64 is a dual tubing structure 66. The structure 66 includes an outer, generally U-shaped tubing member 68 which is fixedly attached to the container 64 at a pair of regions 70, 72. The member 68 is in fluid flow communication with the interior volume of the container 64 and hence the liquid therein. The tubing member 68 thus forms a specimen cell wherein a portion of the liquid L can be collected for subsequent testing and analysis.

A second generally U-shaped tubing member 74 is fixedly attached to the container 64 at regions 76 and 78. However, the tubular member 74 is not in fluid flow communication with the interior of the container 64. The tubular member 74 includes the plurality of analysis cells 50–60.

The specimen cell 68 can be isolated from the container 64 by radio frequency heat sealing at the regions 80, 82. When so isolated, the contents of the specimen cell 68 are a sample obtained from the liquid L in the container 64 but now separated therefrom. Flow members 84 and 86 provide closed fluid flow paths between the specimen cell 68 and the analysis cells 50–60 in the member 74.

The fluid flow members 84 and 86 each are closed by a respective frangible barrier **84*a* and 86*a*. The barriers 84*a* and 86*a* can be manually broken subsequent to isolating the specimen cell 68. Once the members 84*a* and 86*a* have been broken, fluid in the specimen cell 68 can flow into the analysis member 74**.

The analysis member 74 in an analogous fashion, as described with respect to FIG. 2, can include a plurality of test reagents 50–60 of the same general type as described with respect to FIG. 2. Once the frangible members **84*a* and 86*a* have been broken, and the specimen has flowed into the analysis member 74 and interacted with various reagents 50–60, a visual indicator, such as a predetermined color, results. The colors can be used to identify blood type as well Rh factor. A plurality of labels 75 can be attached to the analysis cell 74** to provide a printed indicia of blood type and Rh factor.

The embodiment of FIG. 3 has the advantage that the analysis cells in the member 74 will remain isolated from the sample cell 68 as well as the container 64 until the frangible members **84*a* and 86*a*** have been broken. Hence, the analysis function will not take place until it is desirable to do so.

Figure 4:
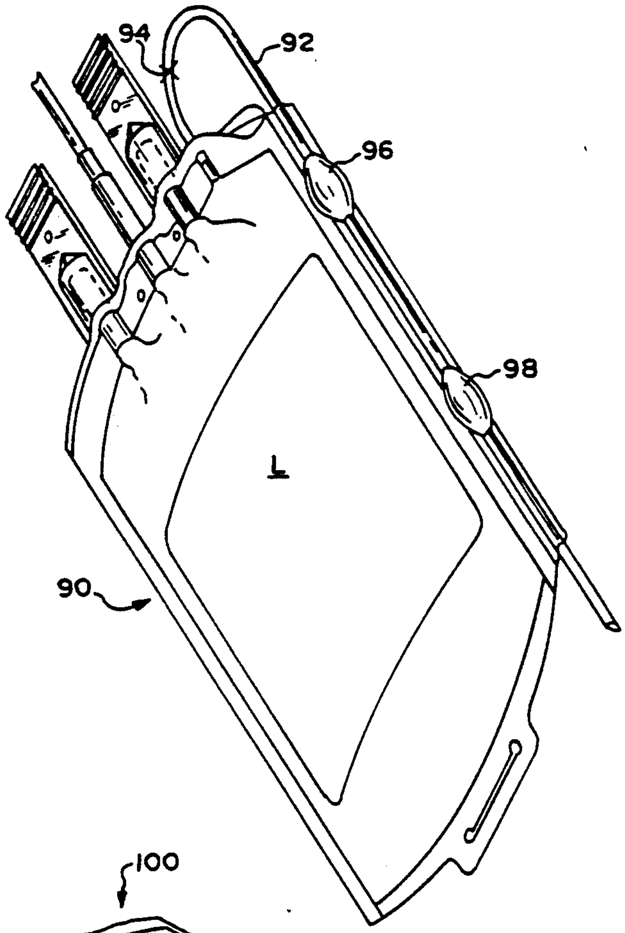
FIG. 4 is a perspective view of yet another aternate container with attached specimen and reagent cells.

Yet another embodiment is illustrated in FIG. 4. A container 90 containing a liquid L is illustrated with tubular member 92 fixedly attached thereto. Tubular member 92 in addition to being fixedly attached to the container 90 is also in fluid flow communication with the liquid L therein. Subsequent to collecting the liquid L, a portion of that liquid will flow into the tubular member 92. Tubular member 92 can be isolated by radio frequency heat sealing at a site at 94. The liquid trapped in the tubular 92 then becomes a test specimen.

Fixedly formed on tubular member 92 are first and second analysis cells 96 and 98. The cells 96 and 98 can be formed with internal frangible members which separate test reagents from the specimen in the tubular member 92. Crushing the sample cells 96 and 98 breaks the frangible members and allows the specimen to come in contact with the reagents contained therein. If the sample cells 96 and 98 are formed of a transparent plastic, a characteristic color indicating the presence or absence of a predetermined fluid characteristic can be observed by visual inspection. It may be desirable to heat seal the tubular member 92 or otherwise disconnect fluid flow between the sample cells 96 and 98 after the specimen has contacted the reagents.

With respect to the embodiments of FIGS. 2–4, it is a significant advantage that the sample is never removed from the respective container although it may be isolated from the remainder of the liquid in the container. It is further advantage of the embodiments of FIGS. 2–4 that the analysis is carried out in cells fixedly attached to the respective container.

Figure 5:
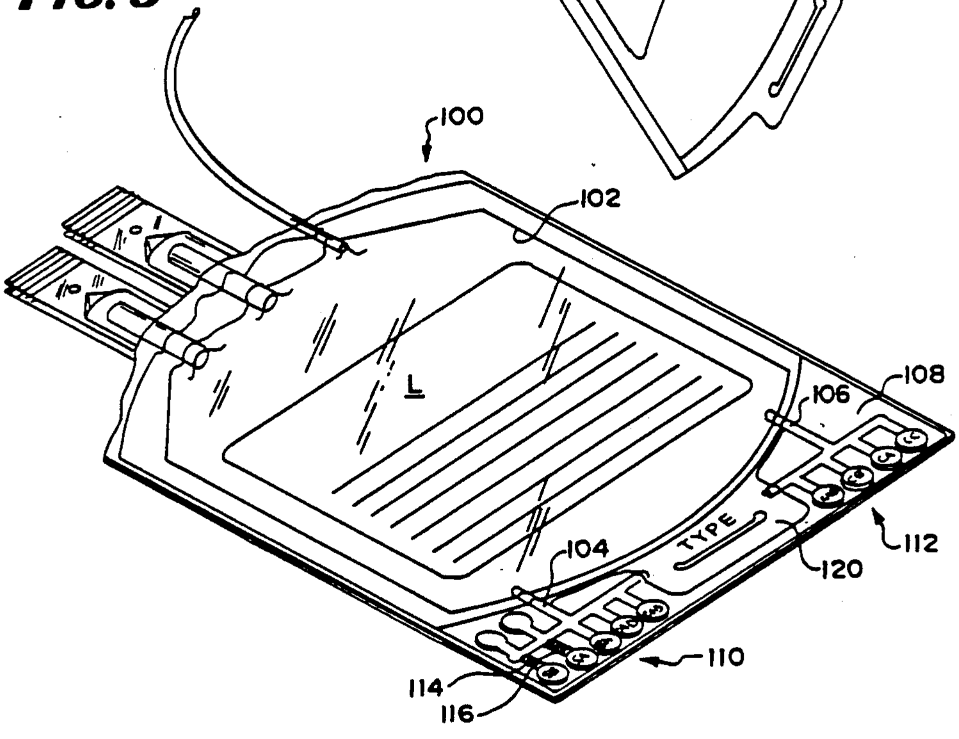
FIG. 5 is a perspective view of a modified container with integrally formed specimen cells and with a region for permanently marking the container with analysis results.

FIG. 5 is a perspective view of another container 100 suitable for accumulating a liquid L therein. In contradistinction to the embodiments of FIGS. 2–4, the container 100 which is formed with an internal region 102 includes first and second fluid flow conduits 104 and 106 which are integrally formed on a region 108 of the container 100. The fluid flow conduits 104 and 106 are in fluid flow communication with the internal region 102 of the container 100. The liquid L can flow into the conduits 104 and 106 from the region 102.

Also in fluid flow communication with the conduits 104 and 106 respectively are pluralities of specimen cells 110 and 112. The plurality of specimen cells 110 is in fluid flow communication with the conduit 104. The plurality of specimen cells 112 is in fluid flow communication with the fluid flow conduit 106. Hence, the members of the pluralities of specimen cells 110 and 112 can be at least partly filled with liquid L from the interior 102 of the container 100.

In addition, selected filters 114 and 116 can be integrally formed with the respective members of the plurality of cells 110. The container 100 also includes an integrally formed region 120 upon which can be marked a permanent indicia of the results of any analysis carried out on the specimens in the cells 110 and 112.

Figure 6:
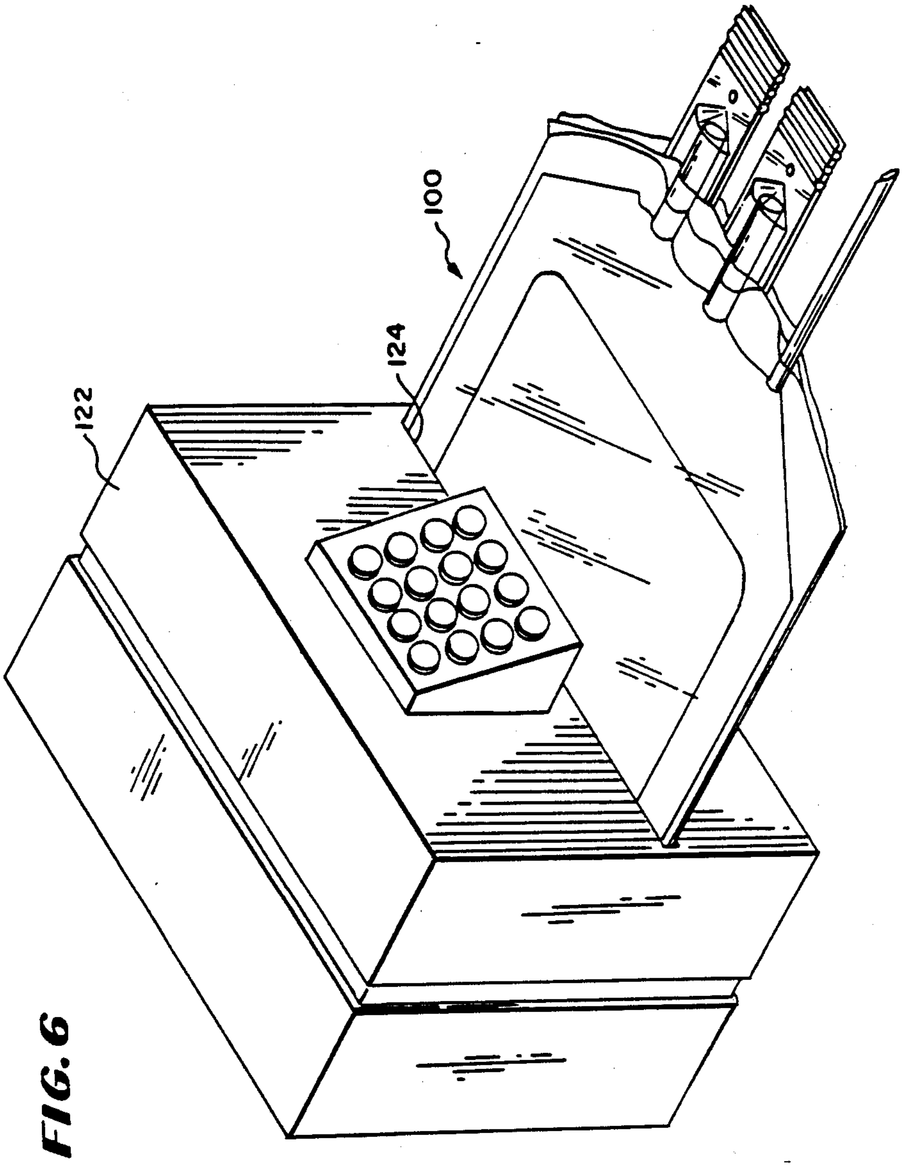
FIG. 6 is an over-all view in perspective of a modified container positioned within an analysis apparatus.
Figure 7:
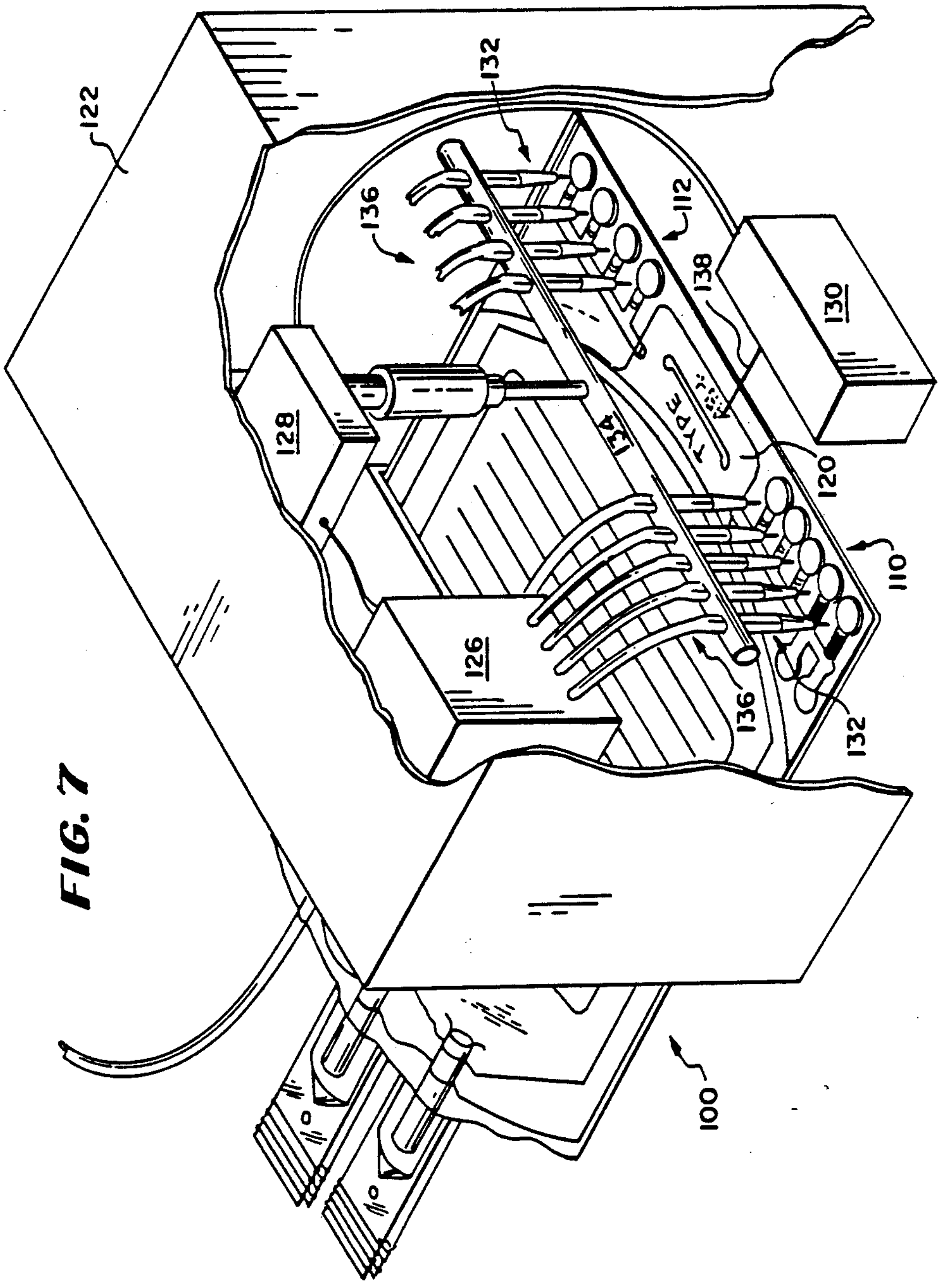
FIG. 7 is a perspective view of the rear section, partly broken away, of a portion of the analysis device of FIG. 6 illustrating schematically extraction and analysis of samples from specimen cells.

FIGS. 6 and 7 illustrate the container 100 inserted into a blood analysis apparatus 122. Devices that will carry out essentially automatic blood analysis are generally known and are available commercially. One such unit is available under a trademark GROUP-O-MATIC 2000 from Kontron Ltd. FIGS. 6, 7 illustrate blood analysis device 122 that incorporates the analysis functions of the commercially available products.

As illustrated in FIGS. 6 and 7, the container 100 can be inserted into a slot 124 in the test apparatus 122. The apparatus 122 includes an analysis module 126, a control unit and actuator 128 and a controllable source of radiant energy, such as a laser, 130. A plurality of piercing cannulae 132 are supported by a rigid, elongated member 134. The member 134 is extendable and retractable by the actuator and control unit 128. The piercing cannulae 132 are in fluid flow communication with the analysis module 126 by means of a plurality of tubing members 136.

When the container 100 has been inserted into the test apparatus 122 and operation of the apparatus is initiated, the control unit and actuator 128 extends the piercing cannulae 132 so as to pierce the pluralities of sample cells 110 and 112. Samples from the cells 110 and 112 are taken directly therefrom into the analysis module 126.

The analysis module 126 determines whether or not the characteristics being test for are present. That information is fed to the control unit and actuator 128. The analysis can include ABO typing as well as Rh factor determination.

The control unit and actuator 128 in turn is coupled to the source of radiant energy, such as the laser 130. Output from the laser, a beam of radiant energy 138 can be used to permanently mark the region 120 of the container 100 with the results of the desired analysis. For example as illustrated in FIG. 7, a blood type and Rh factor can be permanently marked on the region 120. The beam of radiant energy 138 can be used to expose a photo-optical material 120. Alternatively, the region 120 could be selectively fused or burned to form the permanent indicia.

Figure 8:
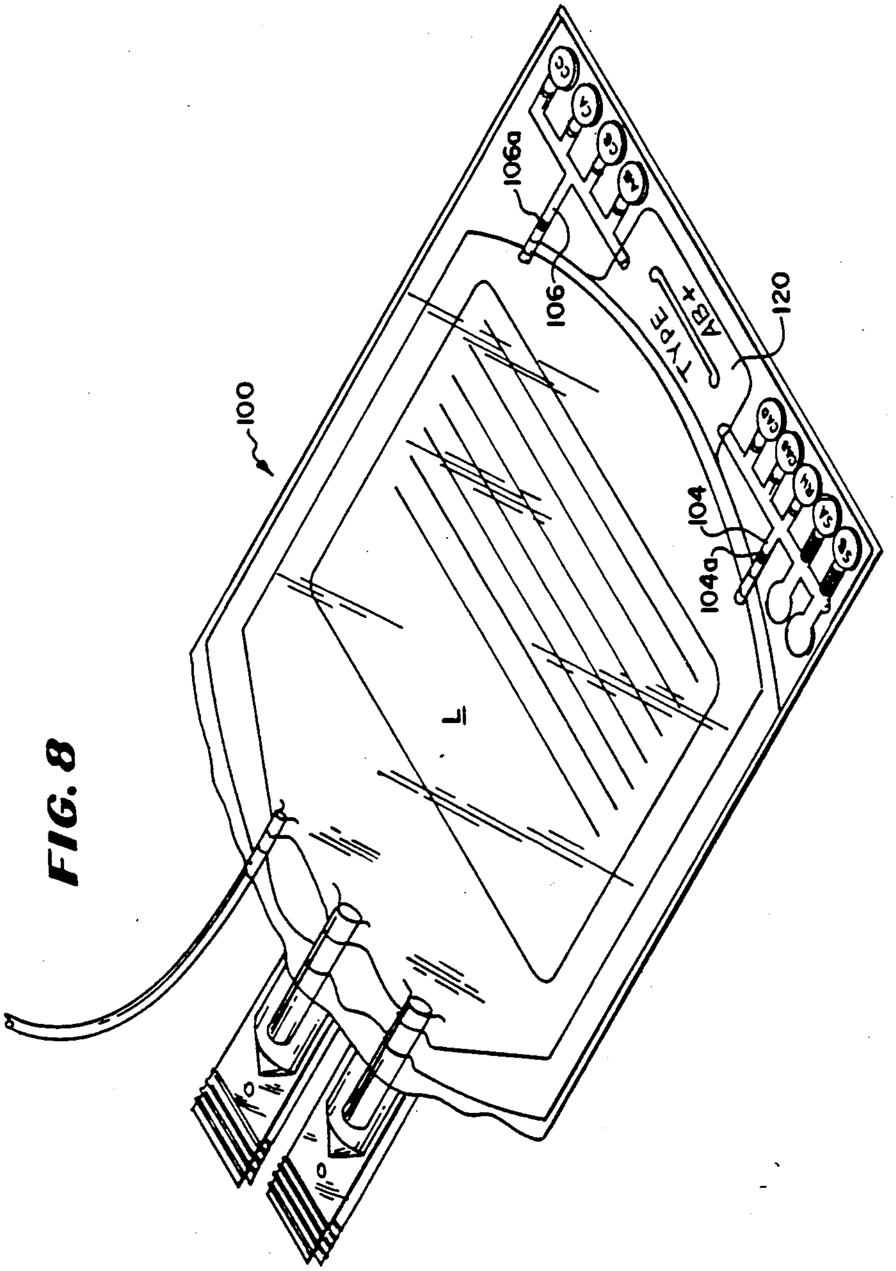
FIG. 8 is a perspective view of a modified container permanently labeled with the results of the analysis.

FIG. 8 illustrates the bag 110 with the test results marked onto the region 120. The region 120 is fixedly attached to the container 100. As a result, the blood type will be permanently affixed to the container 100 even though it may be transported from one center to another and stored numerous times. FIG. 8 also illustrates the regions **104*a* and 106*a* where at the respective fluid flow conduits 104 and 106 have been sealed so as to isolate the contents of the specimen cells 110 and 112 from the remainder of the fluid L and the container 100**.

If desired, the analysis apparatus 122 could also include a roller press to force liquid specimens through the filters 114 and 116 prior to analysis.

An advantage of the embodiments of FIGS. 5–7 is that a permanent, readable, indicia of the test results is recorded directly on the container 100 for subsequent reference. Since the indicia can be formed of alphanumeric characters or symbols, a variety of test results can be indicated on the region 120.

Figure 9:
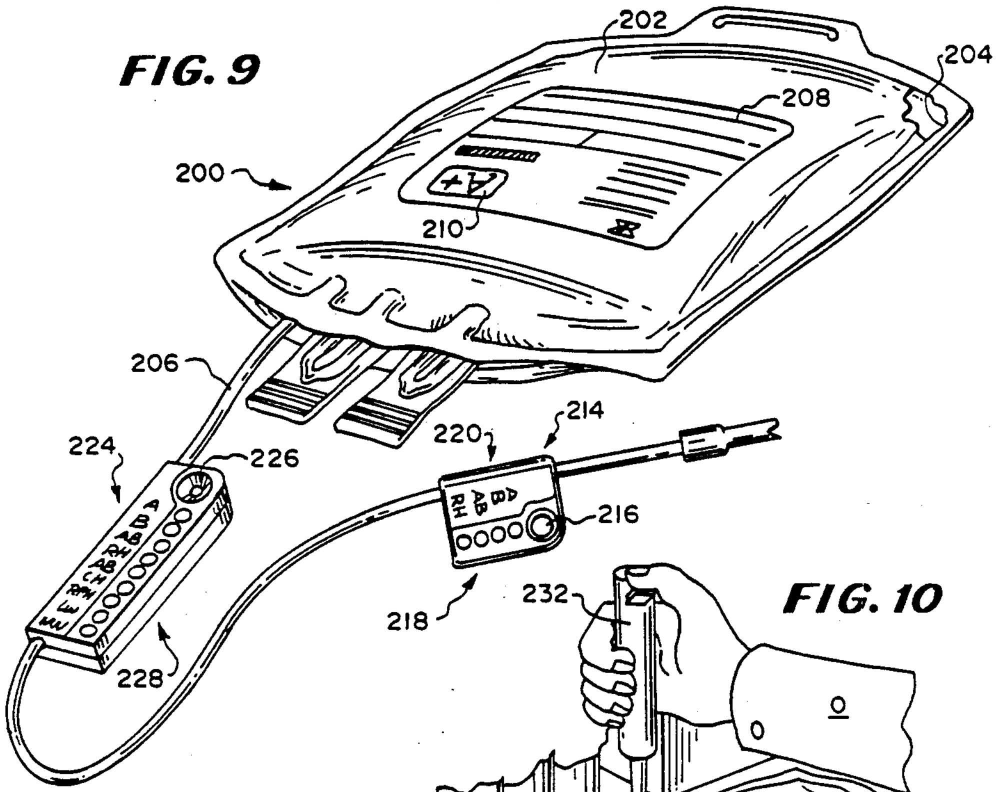
FIG. 9 is a perspective view of a collection container with test cells attachable to a tubular member in fluid flow communication with the contents of the container.

FIG. 9 illustrates a fluid delivery system 200 in accordance with the present invention. The system 200 includes a container 202 usable for the accumulation of a preselected fluid. The container defines a fluid accumulating volume 204. Affixed to the container 202 is a tubular member 206. An interior lumen **206*a* of the tubular member 206 is in fluid flow communication with the interior volume 204 of the container 202**.

For example and without limitation, the container 202 could be a whole blood collection container of a type noted previously usable in the collection of whole blood. Alternately, the container 202 could be a blood component collection container.

The container 202 carries a preprinted label 208 produced as discussed subsequently. Among other information, the label 208 can include an indicium 210 of a predetermined characteristic of the fluid accumulated in the volume 204. For example, if the accumulated fluid is whole blood the indicium 210 can correspond to blood type as well as Rh factor.

Permanently, affixed to and carried by the tubing member 206 is a four-test sample cell 214. The sample cell 214 is formed separately from the container 202 or the tubular member 206. However, the sample cell 214 can be permanently affixed to the tubular member 206 as described subsequently.

While the sample cell 214 is illustrated affixed to the tubular member 206, it will be understood that the sample cell 214 could also be permanently affixed to a predetermined region of the container 202. The sample cell 214 includes a reagent injection port 216 along with a plurality of spaced apart optically viewable display ports 218. Each of the display ports 218 displays a predetermined selected color in response to a corresponding characteristic having been detected in the test specimen. For example, the sample cell 214 can test whole blood to determine its type as well as Rh factor. A manually readable label 220 is affixed to the sample cell 214 for the purpose of enabling a person to determine what blood type or Rh factor is associated with each test result display port in the plurality 218.

A second sample cell 224 is also illustrated permanently affixed to the tubing member 206. The sample cell 204 is similar to the sample cell 214 with the exception that it can carry out a larger number of tests.

The sample cell 224 includes a reagent input port 226 along with a plurality of display ports 228 which display visually observable test result indicia.

Figure 10:
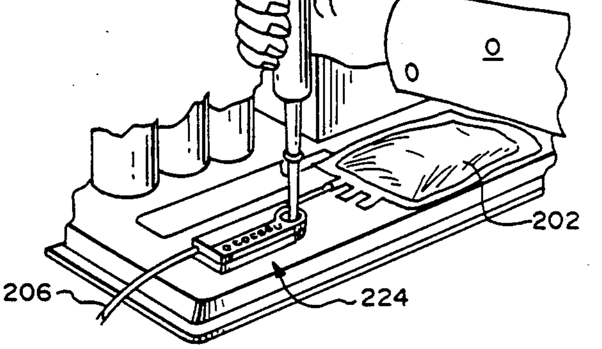
FIG. 10 is a fragmentary view in perspective of one of the steps of using the attachable test cell of FIG. 9.

FIG. 10 illustrates a step in the use of the fluid delivery system 200. In FIG. 10, the container 202 has been filled at least in part with a predetermined quantity of fluid. In the process of filling the container 202 or accumulating fluid therein, the fluid has passed through the tubing member 206.

As is well recognized, a certain portion of the fluid drains into the container 202. However, a portion of the fluid remains in the tubing member 206. The portion of the fluid which remains in the tubing member 206 is identical to the fluid in the container 202. When the sample cell 224 is permanently affixed to the tubing member 206 it isolates a portion of the internal fluid containing lumen **206*a* of the tubing member 206 from the remainder of the fluid in the container 202**.

A solution containing one or more reagents of a type discussed previously can be injected into the input port 226 by means of a container 232. As illustrated in FIG. 10, the container 232 is being used by operator O for the purpose of injecting the reagent solution into the test cell 224.

Subsequent to injecting the reagents into the input port 226, at the plurality of display ports 228 one or more of the optically viewable test result indicia will assume a predetermined color in response to the presence or absence of preselected characteristics in the fluid.

It will be understood that a matrix of a selected reagent material could be positioned adjacent each of the display ports 228 when the sample cell 224 is manufactured. In such an embodiment, it would not be necessary to add reagents at the time of use.

In normal use, the sample cell 220 can be affixed to the tubular member 206 at or about the time that the quantity of whole blood is accumulated in the container 202. Subsequently, the larger sample cell 224 can be affixed to the tubular member 206 to carry out additional tests.

Figure 11:
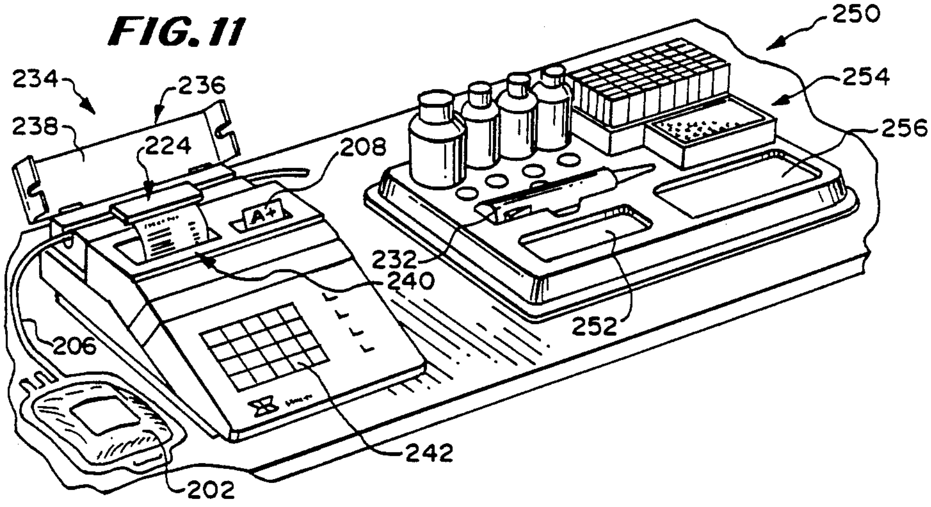
FIG. 11 is an overall perspective view of a system for optically sensng test results displayed by the attachable test cell and for generating labels affixable to the fluid containing container.

FIG. 11 illustrates the sample cell 224 loaded into a terminal 234. The terminal 234 includes a sensor mechanism for optically sensing the indicia 228 at the display ports to determine which of them have exhibited the predetermined color characteristic in response to the injected reagents and the test specimen. The terminal 234 includes a sensor station 236 for this purpose. This sensor station 236 includes a pivotally attached cover 238 which can be closed over the sample cell 224 and remains closed until the terminal 234 generates the label 208 and the label 208 is removed therefrom to be applied to the container 202.

The terminal 234 also includes a hard copy printer for generation of a hard copy record 240 for achival purposes. The record 240 can include an identification of the container 202 as well as the results of the indicia sensing operation. An operator manipulatable keyboard 242 is provided to enable the operator to enter information into the terminal 234.

A disposable tray 250 can also be provided for use with the terminal 234. The tray 250 provides a work station 252 into which is inserted the test cell 224 for purposes of injecting the reagent thereinto. The tray 250 can also include a plurality of replaceable tips 254 usable with the container 232. The container 202 can be supported on a region 256 of the tray 250 during the reagent injection step.

Figure 12:
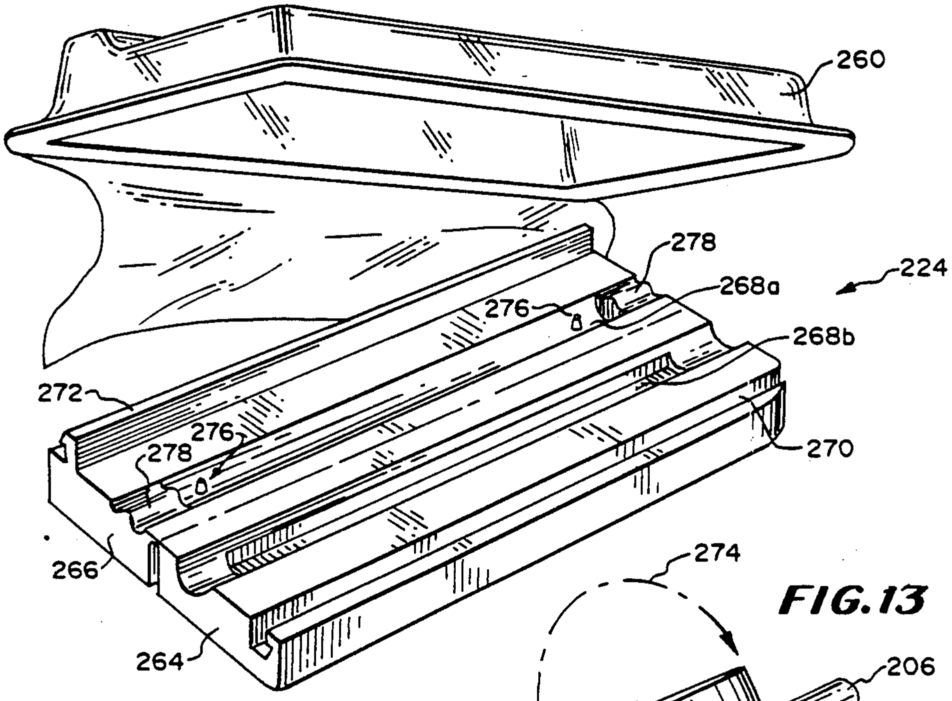
FIG. 12 is an enlarged perspective view of a sample cell being removed from a protective container.

In FIG. 12, the sample cell 224 is shown being removed from a sterile protective container 260. The container 260 can be used to maintain sterility of the sample cell 224 until it is to be applied to the tubing member 206. The pre-packaged sample cell 224 can be sterilized in the container 260 using conventional techniques.

The sample cell 224 includes a first elongated rectangularly shaped rigid housing member 264 which is pivotably attached, such as by a hinge 265, to a second elongated rigid housing member 266. The members 264 and 266 define a tubing receiving volume in slots 268*a* and 268*b*.

Figure 13:
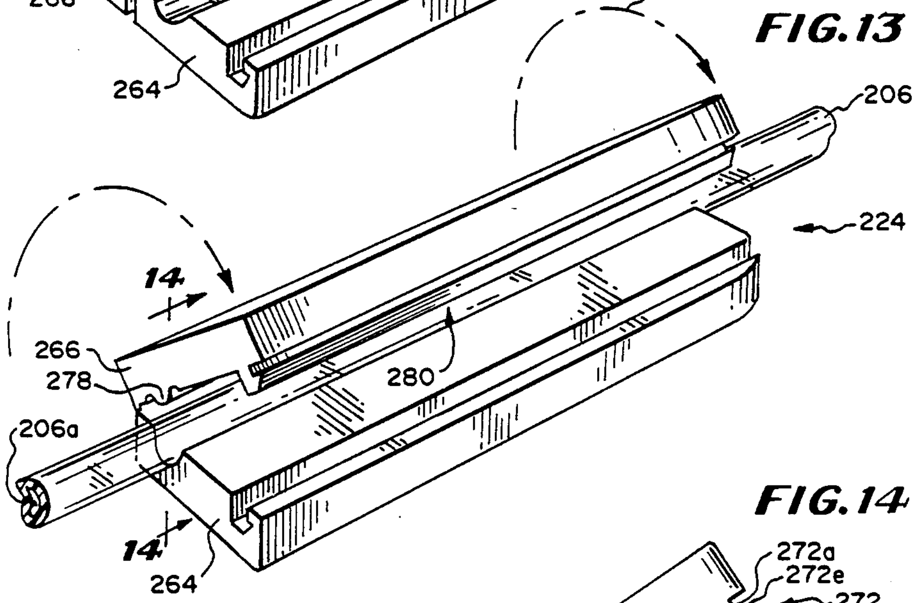
FIG. 13 is a perspective view of the sample cell being fixedly attached to a tubular member containing a test specimen.

The housing member 264 includes an elongated slot 270 which has a generally L-shaped cross section for the purpose of lockingly receiving a correspondingly shaped locking member 272 carried by the housing member 266. The L-shaped cross section of the locking member 272 is such that when the housing member 266 is rotated in a direction 274 (best seen in FIG. 13) so as to engage the housing member 264, the cooperative interaction between the locking member 272 and the locking slot 270 locks the housing members 264 and 266 permanently together.

The housing member 266 carries piercing members 276 for the purpose of engaging and perforating the tubing member 206 in a region located within the closed housing members 264 and 266. In addition, the housing member 266 carries curved isolation members 278 which crimp the tubing member 206 closed when the housing members 264 and 266 are locked together. As a result, an isolated region 280 including an isolated volume 280*a* of fluid F in the lumen 206*a*, is formed between the isolation members 278.

Figure 14:
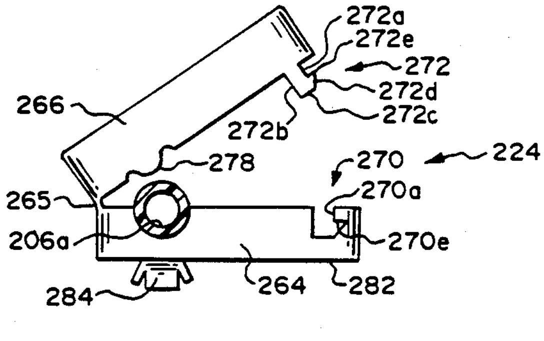
FIG. 14 is an end view, partly in section, taken along the plane 14—14 of FIG. 13.

As best illustrated in FIG. 14, the locking member 272 is formed with first and second spaced apart planar surfaces 272*a* and 272*b*. Surface 272*b* intersects an essentially perpendicular surface thereto 272*c*. Surface 272*c* intersects a biased surface 272*d*.

The surface 272*d* slidably engages a surface 270*a* in the slot 270 when the housing member 266 is rotated into engagement with the housing member 264. The locking member 272 also includes a locking surface 272*e* which engages a locking surface 270*e* in the slot 270 to permanently lock the housing members 264 and 266 together.

FIG. 14 also illustrates the isolating member 278 prior to engagement with the tubing member 206. The housing members 264 and 266 are rotatably joined by a hinge 265.

The housing member 264 is formed with an exterior rectangularly shaped planar surface 282. Extending through the surface 282 is a manually operable fluid injection bar 284. The injection bar 284 provides means for injecting fluid in the region 280*a* from the tubing member 206 into the test region of the sample cell 224.

Figure 15:
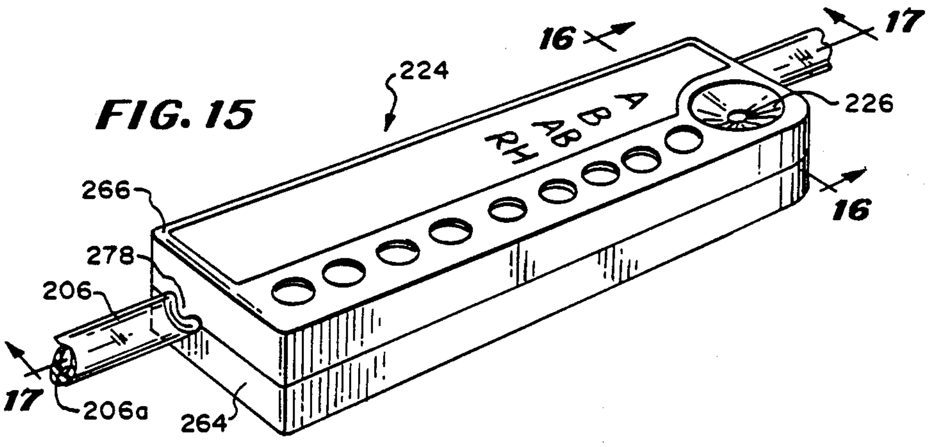
FIG. 15 is a perspective view of the sample cell of FIG. 12 fixedly attached to the tubular member carrying the test specimen.

FIG. 15 illustrates the tubing member 206 with the affixed sample cell 224. The clamping members 278 have crimped closed two spaced apart regions of the member 206.

Figure 16:
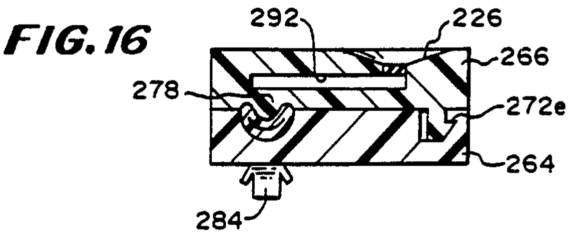
FIG. 16 is a view in section taken along plane 16—16 of FIG. 15.

As illustrated in FIG. 16, the housing members 264 and 266 can be permanently locked together with the isolating members 278 crimping the tubing member 206 thereby providing the isolated region 280 within the test cell 224 as previously discussed.

Figure 17:
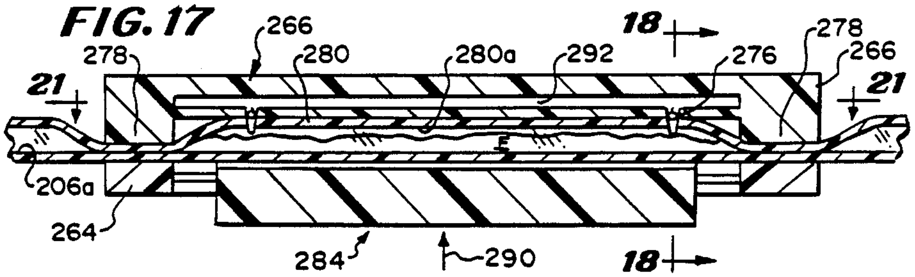
FIG. 17 is a view in section taken along plane 17—17 of FIG. 15.

A fluid flow path 292 couples the reagent injection port 226 to the test regions of the housing member 266. As illustrated in FIG. 17, the isolated volume 280*a* of the region 280 which contains test specimen fluid F is located between the isolating members 278. A movement of the bar 284 in a direction 290 will inject fluid F through the piercing members 276 and into fluid flow paths 292 in the housing member 266.

Figure 18:
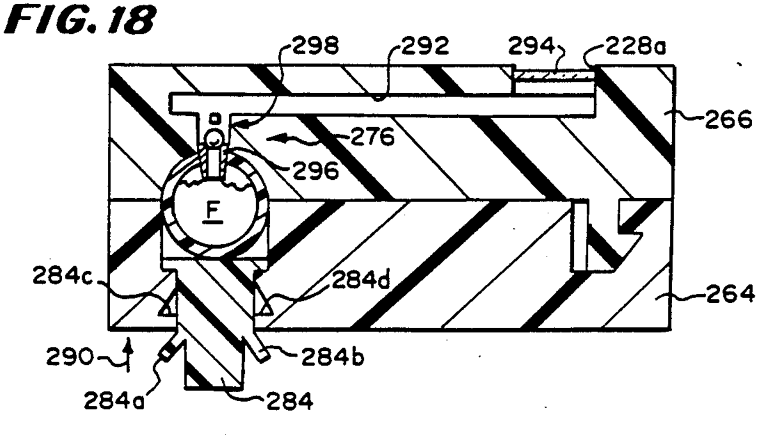
FIG. 18 is an enlarged view in section taken along plane 18—18 of FIG. 17.
Figure 19:
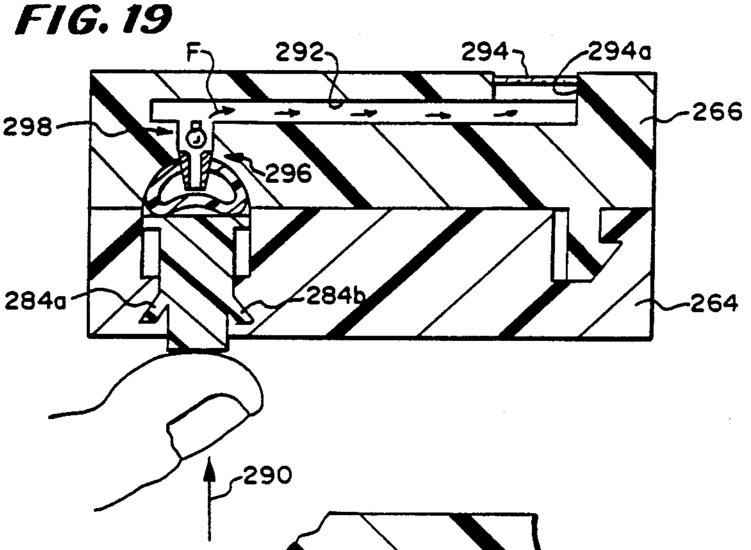
FIG. 19 is a view in section, as in FIG. 18, illustrating one of the steps in a method of using the sample cell.

As best illustrated in FIGS. 18 and 19, the fluid F can be injected into the fluid flow paths 292 in the housing member 266 in response to movement of the injection bar 284 in the direction 290. Movement of the fluid F in the fluid flow path 292 brings a portion thereof into contact with a reagent matrix designed to display a predetermined color in response to a selected characteristic in the fluid F. The indicator matrix 294 can be preloaded with a selected indicating chemical which in response to the injected reagent and a predetermined characteristic in the fluid F will turn a predetermined color. That color can be visually observed via display port 228*a*.

Flexible locking members 284*a* and 284*b* on the injection bar 284 slidably engage locking recesses 284*c* and 284*d* in the housing member 264. When so engaged, the locking members 284*a* and 284*b* prevent movement of the injection bar opposite the direction 290.

As best illustrated in FIGS. 18 and 19, the piercing members 276 include a tapered, hollow, conical housing 296 combined with a one-way check valve 298. It will be understood that the tubing member 206, when inserted into the slot 268*b* would have first been sterilized in accordance with acceptable aseptic technique. The conical housing member 296 then pierces the tubing member 206 as illustrated in FIGS. 18 and 19 to provide a sealed, aseptic fluid flow path between the isolated interior lumen 280*a* and the fluid flow pathway 292. As illustrated in FIG. 19, pressure from the injection bar 284 opens the check valve 298 thereby permitting fluid flow between the region 280*a* and the fluid flow pathway 292.

Figure 20:
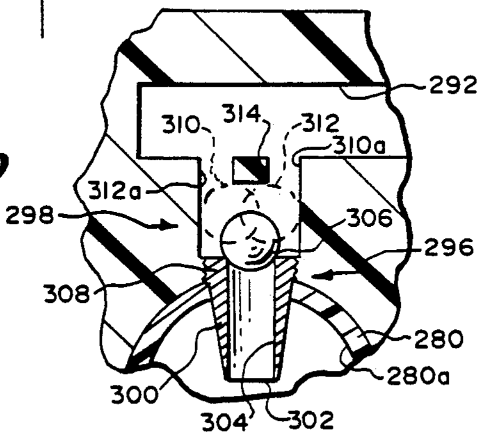
FIG. 20 is an enlarged fragmentary view of a portion of FIG. 19 illustrating a one-way fluid flow control valve.

As best illustrated in FIG. 20, the piercing member 296 includes a conically shaped housing 300 which terminates at an exposed end in a sharp piercing surface 302. The conical housing 300 is hollow with a flow path 304 therethrough.

The check valve 298 includes a check ball member 306 which normally resides against a region 308 of the conically shaped housing 300. The check ball 306 can be deflected in the direction 290 in response to applied fluid pressure and fluid flow through the conduit 304 such that it moves into a first position 310, indicated in phantom in FIG. 20, or a second position 312, also indicated in phantom. The check ball 306 is retained in either the position 310 or the position 312 by a blocking member 314.

When the check ball 306 moves into the position 312 the fluid F flows through an opening 312*a*. When the check ball 306 moves into the position 310, the fluid F flows through an opening 310*a*.

Figure 21:
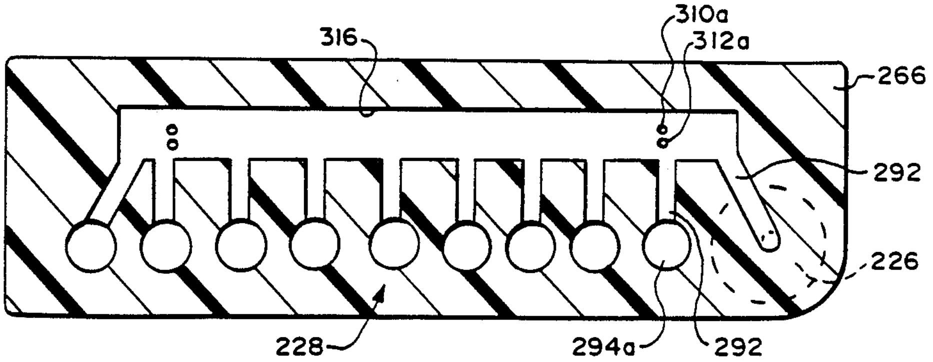
FIG. 21 is a view in section taken along plane 21—21 of FIG. 17 of the fluid flow paths within the attachable sample cell.

As illustrated in FIG. 21, the openings 310*a* and 312*a* are in fluid flow communication with a fluid distributing pathway 316 which extends internally along the housing member 266. A plurality of fluid flow pathways such as pathway 292 extends off of the distribution flow path 316. Each of the pathways, such as the pathway 292 is in fluid flow communication with a test region 294*a* including matrix of a selected reagent, such as the reagent matrix 294. Each of the reagent matrices forms an optically observable indicium, that can be observed at the display ports 228.

Hence, the fluid F when injected through the check valve 298 into the distribution flow path 316 will flow under pressure into each of the test regions, such as the test region 294*a*, which is distributed along the flow path 316. Changes in color of the test reagent matrices provide the previously noted plurality of test result indicia which are viewable at the surface of the sample cell 224.

Figures 22, 23, 24A, 24B:
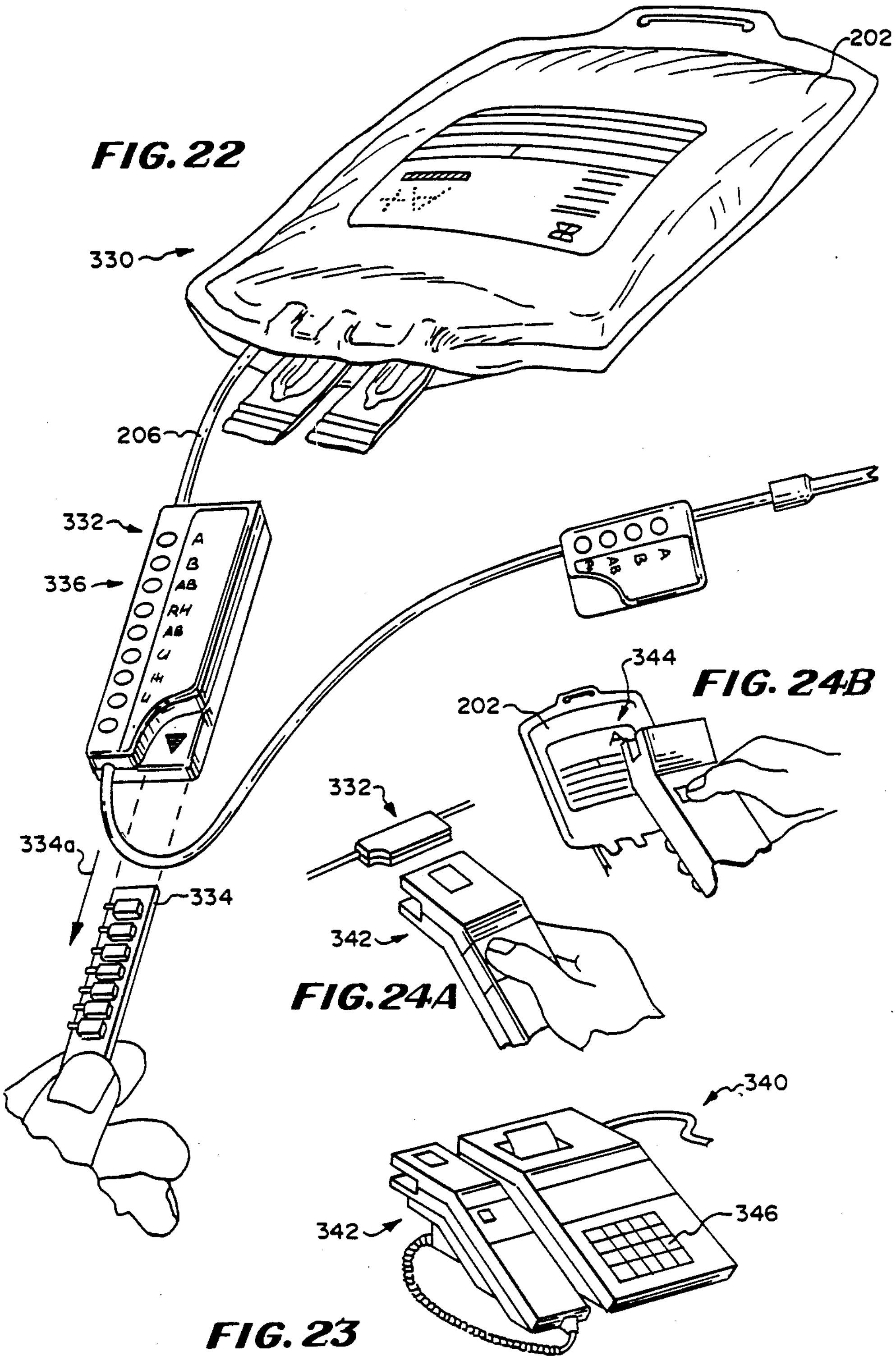
FIG. 22 is a view in perspective of an alternate attachable sample cell.
FIG. 23 is a perspective view of a sensor and marker apparatus usable with the sample cell of FIG. 22.
FIG. 24A is an enlarged fragmentary view in perspective of the sensor portion of the apparatus of FIG. 23.
FIG. 24B is an enlarged fragmentary view in section of the marker portion of the apparatus of FIG. 23.

FIG. 22 illustrates an alternate fluid flow delivery system 330. The system 330 includes a container corresponding to the container 202. Further, the system 330 includes a tubing member corresponding to the tubing member 206. An attachable sample cell 332 has been permanently affixed to the tubing member 206. To activate the sample cell 332 instead of injecting reagents as previously discussed with respect to the test cell 224, an activating member 334 is manually withdrawn from the sample cell 332 thereby activating the test process.

Movement of the activating member 334 injects the necessary reagent to each of the test regions of the test cell 332. A plurality of visually displayable test result indicia can be visually observed by means of display ports 336 carried on the sample cell 332.

A terminal 340, see FIG. 23, can be provided for use with the sample cell 332. The terminal 340 includes a manually manipulatable sense and print head 342. As illustrated in FIGS. 24A and 24B, the sensing region of the sensing and print head 342 can be brought into contact with the indicia of the sample cell 332. The plurality of test result indicating indicia 336 can be sensed and the sensing and printing head 342 can then be used to inprint a corresponding permanent hard copy indicium 344 onto the container 202.

FIG. 25 illustrates yet another fluid flow system 350 in accordance with the invention. The fluid flow system 350 includes a container, such as a container 202 in fluid flow communication with a fluid flow conduit, such as the conduit 206. Permanently affixed to the conduit 206 is an attachable sample cell 352. The sample cell 352 is similar to the sample cell 232. However, in contradistinction to the sample cell 232 injection of the reagent into the test regions of the sample cell 352 is accomplished by moving the manually operable member 354 in a direction 354*a* thereby breaking frangibles within the sample cell 352 and exposing the test material to reagents stored therein.

The sample cell 352 also carries a plurality of result indicating display ports 356 which can be optically examined to determine the presence or absence of predetermined characteristics in the fluid F.

A terminal 360, illustrated in FIG. 27 can also be provided usable with the fluid flow system 350. The terminal 360 includes a sensing region 362 for optically sensing the condition of the plurality of indicia viewable via the display ports 356 on the sample cell 352. A hard copy record 364 can be produced by means of the terminal 360. In addition, the container 202 can be positioned at a marking station 366 and a permanent indicia of the test results can be automatically placed thereon by the terminal 360.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A fluid delivery system comprising:

flexible means, defining a volume, for accumulating a quantity of a pre-selected fluid; and at least one test means attachable to said accumulating means including means for deforming spaced apart regions of said flexible means thereby isolating a sample of the pre-selected fluid such that said sample may be selectively tested while said test means is attached to said accumulating means.

2. A fluid delivery system as in claim 1 with said accumulating means including a tubular member in fluid flow communication with the quantity of preselected fluid, a portion of said tubular member receivable within said test means.

3. A fluid delivery system as in claim 1 with said accumulating means also defining a second volume, in fluid flow communication with said accumulation volume, said test means in fluid flow communication with said second volume when attached to said accumulating means.

4. A fluid delivery system as in claim 3 with said second volume defined within an elongated region carried by said accumulating means.

5. A fluid delivery system as in claim 4 with said elongated region a hollow, flexible tubular member.

6. A fluid delivery system as in claim 3 with said test means carrying a plurality of test result disclosing means.

7. A fluid delivery system as in claim 6 with said result disclosing means including visibly displayed indicia.

8. A fluid delivery ssytem as in claim 6 including means for detecting one or more of said result disclosing means.

9. A fluid delivery system as in claim 8 including means for marking said accumulating means with at least a test result indicating indicium.

10. A fluid delivery system as in claim 3 with said first region rotatable with respect to said second region.

11. A fluid delivery system as in claim 3 with said first region, at least in part, linearly translatable with respect to said second region.

12. A fluid delivery system as in claim 3 including means for locking said first region to said second region with said second volume isolated therein.

13. A fluid delivery system as in claim 12 including means, carried by said test means, for analyzing fluid isolated in said second volume.

14. A fluid delivery system as in claim 3 wherein said test means includes:

a housing with a first region and a second region carried by said housing and rotatably coupled to one another.

15. A fluid delivery system as in claim 14 with said first region carrying means for locking said second region thereto.

16. A fluid delivery system as in claim 15 including means for injecting a quantity of the sample fluid to be tested into said housing.

17. A fluid delivery system as in claim 16 including one-way flow means for blocking fluid flow from sid housing.

18. An apparatus for testing a preselected fluid, accumulated at least in part in a container, and in part in a fluid flow member attached to the container, comprising:

a housing;

means for affixing said housing to a selected flexible region carried by the fluid flow member attached to the container; and means, carried by said housing, for deforming at least part of said selected region thereby defining a test sample including means for testing said sample.

19. An apparatus as in claim 18 with said affixing means including means for permanently locking said housing to the selected region.

20. An apparatus as in claim 18 with said testing means displaying a test result indicating indicium.

21. An apparatus as in claim 20 including means for sensing said indicium.

22. An apparatus as in claim 21 including means for applying a representation of said sensed indicium to said container.

23. An apparatus as in claim 18 with said housing having a first region and a second region with said first region movable with respect to said second region.

24. An apparatus as in claim 23 with said first and said second regions defining a selected region receiving volume.

25. An apparatus as in claim 24 with said testing means carried, at least in part, by said first region.

26. A fluid test module usable to test for the presence or absence of a predetermined characteristic in a fluid sample contained in a flexible member comprising:

a housing separate from the flexible member;

means for affixing said housing to the flexible member; and means, carried by said housing, for deforming the member at first and second spaced apart regions and isolating therebetween a test specimen from the contained fluid sample including means, carried by said housing, for testing for the presence or absence of a selected characteristic.

27. A fluid test module as in claim 26 including means, carried by said housing, for piercing a region of the flexible member.

28. A fluid test module as in claim 27 including means for forcing fluid in the isolated test specimen into a region of said housing.

29. A self-contained fluid test module usable to test for the presence or absence of a predetermined characteristic in a quantity of fluid contained in a flexible, closed, member comprising:

a housing defining a region for receiving a part of the flexible member;

first and second spaced-apart means, carried by said housing, for clamping spaced regions of the part of the flexible member thereby defining an isolated test sample therebetween; and means, carried by said housing, for fixedly attaching said housing to the part of the flexible member including:

means, carried by said housing, for testing for the presence or absence of the predetermined characteristic in the isolated test sample.

30. A self-contained fluid test module usable to test for the presence or absence of a predetermined characteristic in a quantity of fluid contained in a flexible, closed, member comprising:

a housing defining a region for receiving a part of the flexible member;

first and second spaced-apart means, carried by said housing, for clamping spaced regions of the part of the flexible member thereby defining an isolated test sample therebetween; and means, carried by said housing, for fixedly attaching said housing to the part of the flexible member including:

means, carried by said housing between said clamping means, for piercing the flexible member.

* * * * *